United States Patent
Kim et al.

(10) Patent No.: US 7,505,677 B2
(45) Date of Patent: *Mar. 17, 2009

(54) OPTICAL IMAGE STABILIZER FOR CAMERA LENS ASSEMBLY

(75) Inventors: Hee-Seung Kim, Seoul (KR); Jong-Pil Lee, Cheongju-si (KR); Doo-Sik Shin, Suwon-si (KR); Jeong-Kil Shin, Suwon-si (KR)

(73) Assignees: Samsung Electronics Co., Ltd., Maetan-Dong, Yeongtong-Gu, Suwon-Si, Gyeonggi-Do (KR); Ja HWA Electronics Co., Ltd., Hyednam-Ri, Bugi-Myeon,Cheongwon-Gun, Cungcheongbuk-Do (KR)

( * ) Notice: Subject to any disclaimer, the term of this patent is extended or adjusted under 35 U.S.C. 154(b) by 189 days.

This patent is subject to a terminal disclaimer.

(21) Appl. No.: 11/372,661

(22) Filed: Mar. 10, 2006

(65) Prior Publication Data

US 2006/0269263 A1 Nov. 30, 2006

(30) Foreign Application Priority Data

May 31, 2005 (KR) ...................... 10-2005-0046337

(51) Int. Cl.
*G03B 17/00* (2006.01)
*H04N 5/228* (2006.01)
*G03B 7/04* (2006.01)

(52) U.S. Cl. .................................. 396/55; 348/208.99
(58) Field of Classification Search ............. 396/52–55, 396/13; 348/E5.027, E5.046, 208.99, 208.2
See application file for complete search history.

(56) References Cited

U.S. PATENT DOCUMENTS

| | | | | |
|---|---|---|---|---|
| 5,153,633 A | * | 10/1992 | Otani | 396/55 |
| 5,717,960 A | * | 2/1998 | Tomita et al. | 396/55 |
| 5,786,936 A | | 7/1998 | Baumann et al. | 359/557 |
| 6,064,827 A | * | 5/2000 | Toyoda | 396/55 |
| 2002/0112543 A1 | | 8/2002 | Noguchi | |
| 2005/0052570 A1 | | 3/2005 | Enomoto | |
| 2006/0269262 A1 | * | 11/2006 | Shin et al. | 396/55 |
| 2007/0025710 A1 | * | 2/2007 | Shin et al. | 396/55 |

FOREIGN PATENT DOCUMENTS

| | | | |
|---|---|---|---|
| DE | 4342717 | | 6/1994 |
| JP | 62-27315 | | 2/1987 |
| JP | 04-110909 | | 4/1992 |
| JP | 06-046314 | | 2/1994 |
| JP | 10039350 | * | 2/1998 |
| JP | 11-064912 | | 3/1999 |
| JP | 11-064916 | | 3/1999 |
| JP | 2003-110929 | | 4/2003 |
| JP | 2005-102172 | | 4/2005 |
| JP | 2005-217993 | | 8/2005 |
| KR | 2006-39808 | | 5/2006 |

* cited by examiner

*Primary Examiner*—Melissa J Koval
(74) *Attorney, Agent, or Firm*—Cha & Reiter, LLC (57) ABSTRACT

An optical image stabilizer includes a main frame, a driving frame that moves in at least one direction within the main frame, a camera device is mounted on the driving frame, a pair of driving permanent magnets mounted on one of the main frame and the driving frame, a pair of coils mounted on the other of the main frame and the driving frame and faces the pair of driving permanent magnets, and at least one slidable bearing interposed between an inner sidewall of the main frame and an outer sidewall of the driving frame.

16 Claims, 7 Drawing Sheets

SECTION C-C'

SECTION D-D'

FIG.9

OPTICAL IMAGE STABILIZER FOR CAMERA LENS ASSEMBLY

CLAIM OF PRIORITY

This application claims the benefit, pursuant to 35 U.S.C. § 119, to that patent application entitled "Optical Image Stabilizer for Camera Lens Assembly," filed in the Korean Intellectual Property Office on May 31, 2005 and assigned Serial No. 2005-46337, the contents of which are incorporated herein by reference.

BACKGROUND OF THE INVENTION

1. Field of the Invention

The present invention generally relates to a camera lens assembly, and in particular, to an optical image stabilizer for stabilizing an image blurred by movement when a digital camera or an optical device mounted in a mobile communication terminal photographs a subject.

2. Description of the Related Art

With the miniaturization of digital cameras and development of lightweight techniques, mobile communication terminals or devices having optical lenses and camera devices have come into wide use.

As the mobility of a camera lens assembly mounted in a mobile communication terminal increases, image blurring caused by fine vibration or handshaking represents a serious impediment to high quality images. Moreover, frequent photographing during movement increases a need to correct for movement or vibration such as handshaking.

Although high-definition cameras have emerged with the development of optical technology, they lose half their effect due to image blurring caused by vibration, thus, increasing a need for an image stabilizer.

Image stabilizing techniques can be roughly classified into two types. One of them is an electric image stabilization technique, i.e., digital image stabilization (DIS), and electronic image stabilization (EIS), in which blurring is detected from a captured image, data stored in a camera device or a memory, is corrected, and the camera device receives a blurred image and generates a clear image by adjusting a position and a color electrically or using a program.

The electric image stabilization technique does not require high cost because there is no need for separate mechanical and physical configurations and it is easy to adopt due to few constraints on its structure. However, adjustment using a program requires a separate memory or a high-performance camera device. Moreover, a photographing speed may decrease as time required for correcting of a blurred image increases. In addition, the extent to which an afterimage is removed using a program is limited, resulting in degradation of correction.

The second type is referred to as optical image stabilization (OIS). An optical image stabilizer detects user's movements or handshaking and changes the position of an optical lens or a camera device in relation. Therefore, blurring of the image formed in the camera device from vibrating is prevented even in the occurrence of vibration of a photographing device.

In the case of the optical image stabilizer, installation of a separate correction device increases a manufacturing cost and requires an installation space. However, the optical image stabilizer can project a clear image on a camera device and remove an afterimage, thereby maintaining a correction rate of 90% or more. In addition, when camera devices having the same performance are used, the camera device using the optical image stabilizer can capture a clearer image than the camera device using the electric image stabilizer. For these reasons, an optical image stabilizer is more widely used than an electric image stabilizer in a photographing device with high-resolution requirements.

A correction technique using movement of an optical lens can be used in a digital camera or device having a space that is sufficiently large to have a driving unit for driving the optical lens. But there is a limit in using the correction technique for a small-size digital camera or mobile communication terminal having space constraints. To solve the problem, a technique for correcting for vibration by moving a camera device has been actively studied.

Japanese Patent Publication No. Hei. 10-39350 discloses an optical handshaking correction device. In the disclosed handshaking correction device, an X-axis piezoelectric element and a Y-axis piezoelectric element are arranged on the contour of an optical lens and a separate support is provided to support the X-axis and Y-axis piezoelectric elements, thereby causing the optical lens to contact with the driving axis of the X-axis or Y-axis piezoelectric element according to the extent of blurring of a captured image and moving the optical lens by a predetermined distance using frictional force. As such, to install a driving device such as a piezoelectric element on the contour of the optical lens, the outer diameter of the optical lens must be sufficiently large. As a result, the handshaking correction device is difficult to mount on a mobile communication terminal where the length and outer diameter of a camera lens assembly are extremely limited.

Moreover, in order to drive an optical lens having a predetermined weight, a significant amount of driving force should be generated, causing a difficulty in miniaturization of a driving device. In addition, a great deal of power is required, thus, making it difficult to mount the handshaking correction device on a portable photographing device using a rechargeable battery.

Furthermore, a difficulty in designing a small-size driving device and a raise in the manufacturing cost caused by an increase in the number of parts impede the cost competitiveness of a photographing device having the handshaking correction device embedded therein.

Moreover, in the case of a contact driving device such as a piezoelectric element using frictional force with its driving axis, it is difficult to control the tolerance of a contact face and secure reliability due to malfunction resulting from abrasion of the contact face. In addition, a driving circuit for generating and applying a specific voltage waveform is required to drive the driving device such as a piezoelectric element, thus further increasing the manufacturing cost and imposing a limitation on the miniaturization of a photographing device.

SUMMARY OF THE INVENTION

It is, therefore, an object of the present invention to provide an optical image stabilizer for a camera lens assembly, which can be embedded in a small-size and lightweight photographing device such as a super compact digital camera or a mobile communication terminal that allows the photographing device to capture a clear image even when the photographing device vibrates due to handshaking.

It is another object of the present invention to provide an optical image stabilizer for a camera lens assembly, which has a simple structure, is easy to control, and reduces its manufacturing cost by moving a camera device according to user's handshaking using a coil and a permanent magnet.

It is still another object of the present invention to provide an optical image stabilizer for a camera lens assembly, in which the reliability of a product can be improved by using non-contact driving for handshaking correction.

It is yet another object of the present invention to provide an optical image stabilizer for a camera lens assembly, in which a slidable bearing is inserted between a fixed portion and a driving portion to facilitate the movement of the driving portion in handshaking correction.

It is yet another object of the present invention to provide an optical image stabilizer for a camera lens assembly, in which a correction rate can be improved by configuring a driving portion to move in at least two directions for handshaking correction.

According to one aspect of the present invention, there is provided an optical image stabilizer for a camera lens assembly. The optical image stabilizer includes a main frame, a driving frame, a camera device, a pair of driving permanent magnets, a pair of coils, and at least one slidable bearing. The driving frame moves in at least one direction on the main frame. The camera device is mounted on the driving frame. The pair of driving permanent magnets is mounted on one of the main frame or the driving frame. The pair of coils is mounted on the other of the main frame and the driving frame and faces the pair of driving permanent magnets. The at least one slideable bearing is interposed between an inner sidewall of the main frame and an outer sidewall of the driving frame to facilitate movement of the driving frame. The driving frame moves through interaction between an electromagnetic force generated by application of a current to the coils and a magnetic force of the driving permanent magnets.

BRIEF DESCRIPTION OF THE DRAWINGS

The above features and advantages of the present invention will become apparent from the following detailed description when taken in conjunction with the accompanying drawings in which.

DETAILED DESCRIPTION

Embodiments of the present invention will now be described in detail with reference to the annexed drawings. For the purposes of clarity and simplicity, a detailed description of known functions and configurations incorporated herein has been omitted for conciseness.

Figure 1:
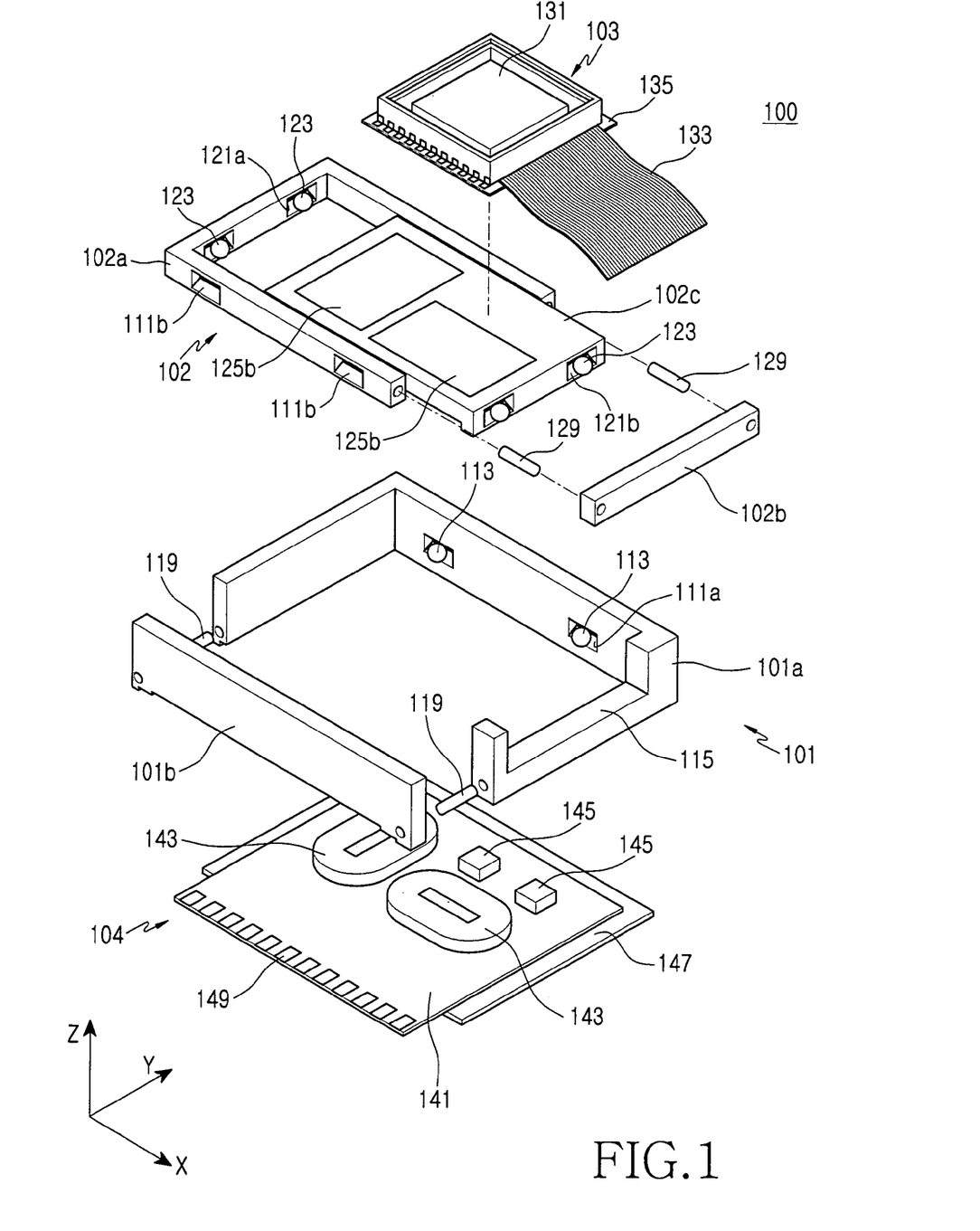
FIG. 1 is an exploded perspective view of a camera lens assembly according to a first embodiment of the present invention.
Figure 2:
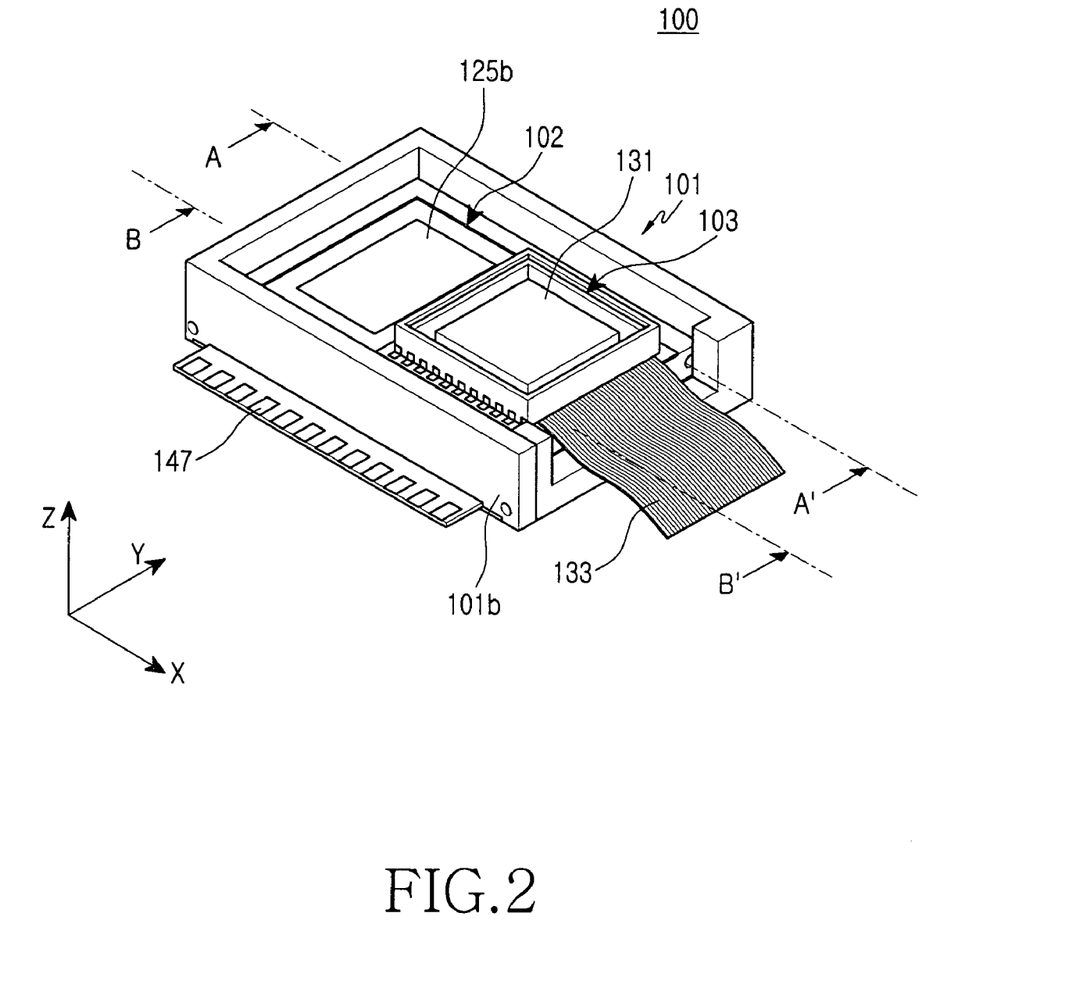
FIG. 2 is an assembled perspective view of an optical image stabilizer for the camera lens assembly shown in FIG. 1.
Figure 3:
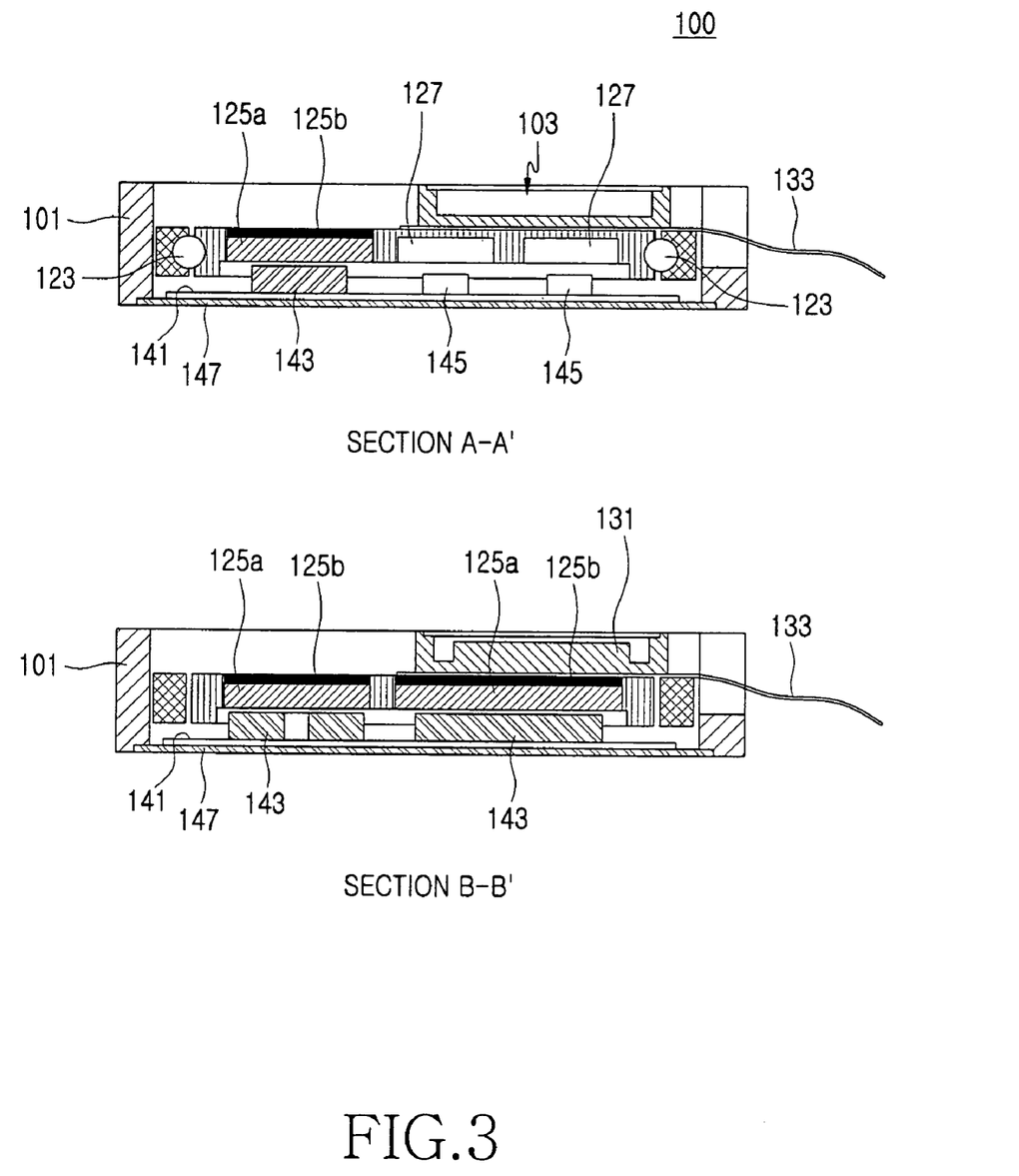
FIG. 3 is a cross-sectional view of an optical image stabilizer for a camera lens assembly, taken along lines A-A' and B-B' of FIG. 2.

As shown in FIGS. 1 through 3, an optical image stabilizer 100 for a camera lens assembly according to a first embodiment of the present invention, FIG. 1 illustrates an exploded perspective view of optical image stabilizer 100. FIG. 2 illustrates an assembled view of optical image stabilizer 100 and FIG. 3 illustrates cross-sectional views of optical image stabilizer 100 along Sections A-A' and B-B', respectively. Referring to FIG. 1, optical image stabilizer 100 includes a main frame 101, a driving frame 102, a coil 143, and a permanent magnet (125a of FIG. 3), in which the driving frame 102 moves on the main frame 101 through interaction between the coil 143 and the permanent magnet 125a to change the position of a camera device 103, thereby correcting for blurring of a captured image due to user's handshaking.

At least a portion of the top of the main frame 101 is opened to allow a subject image to incident to the camera device 103. At least one first sliding groove 111a is formed in inner sidewalls of the main frame 101 along a first direction X. The bottom of the main frame 101 is closed by a coil portion 104. A printed circuit board (PCB) 141 whose one end has a connector 149 formed therein, a pair of coils 143 mounted on the PCB 141, and position detecting sensors 145 for detecting movement of the driving frame 102 and the amount thereof are mounted in the coil portion 104. The coils 143 may be a winding coil wound by a winding machine or a laminated coil manufactured using micro electro mechanical systems (MEMS). A yoke 147 is mounted on the bottom surface of the PCB 141. The main frame 101 surrounds the driving frame 102, and a first frame member 101a whose one side surface is opened and a second frame member 101b closing one side surface of the first frame member 101a are combined with the first frame member 101a by a press-fit pin 119.

The driving frame 102 includes first frames 102a and 102b surrounded by the main frame 101 and a second frame 102c surrounded by the first frame 102a.

The first frames 102a and 102b include second sliding grooves 111b formed in an outer sidewall along the first direction X and the second sliding grooves 111b are positioned in opposition to the first sliding grooves 111a. The first sliding grooves 111a and the second sliding grooves 111b extend in the first direction X. A ball bearing 113 is interposed between the main frame 101 and the first frames 102a and 102b. A portion of the ball bearing 113 is accommodated in the first sliding groove 111a and the remaining portion of the ball bearing 113 is accommodated in the second sliding groove 111b, thereby separating the inner sidewalls of the main frame 101 and the outer sidewalls of the first frames 102a and 102b. Since the first sliding grooves 111a and the second sliding grooves 111b are formed in both inner sidewalls of the main frame 101 along the first direction X and both inner sidewalls of the first frames 102a and 102b, the first frames 102a and 102b can easily move along the first direction X with substantially minimum friction with the main frame 101.

In other words, the first sliding grooves 111a and the second sliding grooves 111b and the ball bearing 113 are combined and serve as slidable bearings for facilitating movement of the first frames 102a and 102b. It is preferable that combination for the slidable bearings allow the first frames 102a and 102b to move with respect to the main frame 101 only along the first direction X while restricting movement along other directions. Thus, it is preferable that the cross-sections of the first sliding grooves 111a and the second sliding grooves 111b be in the shape of 'V'.

The second frame 102c is accommodated in the first frames 102a and 120b and moves along a second direction Y. The second direction Y is set perpendicular to the first direction X.

To facilitate the assembly of the second frame 102c, the first frames 102a and 102b include a third frame member 102a whose one end is opened and a fourth frame member 102b closing the opened end of the third frame member 102a, and the third frame member 102a and the fourth frame member 102b are combined by a press-fit pin 129.

Since the second frame 102c is accommodated in the first frames 102a and 102b, the second frame 102c can move with respect to the first main frame 101 along the first direction X. In addition, since the second frame 102c can move along the second direction Y on the first frames 102a and 102b, the second frame 102c can move with respect to the main frame 101 along both the first direction X and the second direction Y.

A pair of driving permanent magnets 125a facing the pair of coils 143 and sensor permanent magnets (127 of FIG. 3) facing the position detecting sensors 145 are installed in the second frame 102c. Yokes 125b forming the magnetic path are attached on the top surfaces of the driving permanent magnets 125a for the effective use of the magnetic force of the driving permanent magnets 125a.

The driving permanent magnets 125a generate a driving force for moving the second frame 102c through interaction with the coils 143 and the position detecting sensors 145 detect changes in the position of the sensor permanent magnets 127 that monitor the moved position of the second frame 102c.

To allow the second frame 102c to smoothly move along the second direction Y, at least one third sliding groove 121a is formed in an inner sidewall of the first frames 102a and 102b extending along the second direction Y and a fourth sliding groove 121b is formed in an outer sidewall of the second frame 102c in opposition to the third sliding groove 121a.

A ball bearing 123 is interposed between the first frames 102a and 102b and the second frame 102c, more specifically, between the third sliding groove 121a and the fourth sliding groove 121b to facilitate movement of the second frame 102c along the second direction Y. In other words, the third sliding groove 121a and the fourth sliding groove 121b extend along the second direction Y. A slidable bearing is thus constructed by such combination of the third sliding groove 121a and the fourth sliding groove 121b and the ball bearing 123. The slidable bearing can be easily understood by the ball bearing combination between the main frame 101 and the first frames 102a and 102b.

The first sliding groove 111a is formed at both inner sidewalls of the main frame 101 as a pair, and the second sliding groove 111b, the third sliding groove 121a, and the fourth sliding groove 121b are also formed in the same sidewall as a pair, respectively, to restrict the movement of the first frame 102a and the second frame 102c to horizontal movement only on a specific plane.

The camera device 103 is mounted on the second main frame 102c. The camera device 103 includes an image sensor 131 receiving an image of a subject and a flexible printed circuit 133 transmitting an image signal input from the image sensor 131 and is mounted on the second frame 102c by being supported by a predetermined board 135. Thus, the camera device 103, together with the second frame 102c, can move along the first direction X and the second direction Y with respect to the main frame 101.

The main frame 101 is mounted and fixed on a photographing device such as a digital camera or a mobile communication terminal. A current is applied to the coils 143 according to the degree of a user's handshaking in photographing, and thus, the position of the second frame 102c, and more specifically, the camera device 103 is changed.

At this time, one of the coils 143, together with the driving permanent magnet 125a opposite thereto, is mounted along the first direction X and the other coil 143, together with the driving permanent magnet 125a opposite thereto, is mounted along the second direction Y. An electromagnetic force generated by a current applied to the coils 143 interacts with a magnetic force of the driving permanent magnets 125a to move the second frame 102c along the first direction X and/or the second direction Y.

When the current is not applied to the coils 143, attraction acts between the driving permanent magnets 125a and the yoke 147 of the coil portion 104, thus the second frame 102c returns to an initial position that is set during initial assembly.

The driving permanent magnets 125a and the yoke 147 of the coil portion 104 restrict movement of the second frame 102c along a third direction Z, i.e., a direction incident to an image of a subject, using attraction therebetween. At the same time, the first through fourth sliding grooves 111a, 111b, 121a, and 121b facilitate movement of the second frame 102c along the first direction X and the second direction Y, but restricts movement of the second frame 102c along another direction, thereby restricting movement of the camera device 103 along third direction Z. Thus, deviation of the camera device 103 from the focus distance of a lens system (not shown) mounted in front of the camera device 103 can be restricted.

When attraction between the driving permanent magnets 125a and the yoke 147 of the coil portion 104 is too weak, due to the weak magnetic force of the driving permanent magnets 125a, to restrict movement along the third direction Z, an additional elastic member (not shown) like a spring may be further mounted. The elastic member may be mounted between the main frame 101 and the driving frame 102 to restrict movement of the second frame 102c along the third direction Z.

The yokes 125b attached to the top of driving permanent magnets 125a and the yoke 147 of the coil portion 104, opposite yokes 125b, (see FIG. 3) form a magnetic field shielding structure that provides for the effective action of the magnetic force of the driving permanent magnets 125a while restricting an outflow of the magnetic field, thereby preventing the magnetic force of the driving permanent magnets 125a from having an influence upon a peripheral circuit device.

The position detecting sensors 145 detect the moved position of the second frame 102c and are separated from the coils 143 by a predetermined distance so as not to be affected by the electromagnetic force generated by the coils 143. The position detecting sensors 145 may be optical sensors or hall sensors. The optical sensor can provide high-precision detection, but is expensive, increasing manufacturing cost. The hall sensor has lower detection sensitivity than the optical sensor, but is cheap and provides sensitivity suitable for handshaking correction. In the current embodiment of the present invention, the position detecting sensors 145 are configured using a pair of hall sensors and the sensor permanent magnets 127 (not shown) are mounted on the second frame 102c to detect a change in the position of the second frame 102c.

Since most photographing devices including the optical image stabilizer 100 use a chargeable battery, the driving permanent magnets 143 of an ND type having a strong magnetic force are used to reduce power consumed by the optical image stabilizer 100. When permanent magnets having a strong magnetic force are used, the response speed or correction speed of the driving frame 102 may decrease due to excessive attraction between the yoke 147 of the coil portion 104 and the permanent magnets 125a on the second frame 102c. Thus, it is desirable to set the strength of permanent magnets based on attraction caused by a magnetic force, the weight of a driving frame, a frictional force in movement for handshaking correction.

In another aspect, a yoke having permeability or a separate permanent magnet may be arranged in a side of the main frame 101 to more accurately maintain an initial stop position of the camera device 103 using attraction or repellant with the permanent magnets 125a of the second frame 102c. Thus, it is easy to implement an algorithm for controlling the position of the second frame 102c and to improve correction speed.

The yokes 125b attached to the permanent magnets 125a and forming a magnetic path reduce the magneto-resistance of magnetic flux generated in the permanent magnets 125a and increase the strength of a magnetic force provided to the coils 143. It is preferable that the yokes 125b be formed of metal having high permeability and the yokes 125b may be separated, deposited or integrated in one body according to the position of the permanent magnets 125a.

The image sensor 131 is a photoelectric conversion device on which an image of a subject to be photographed is incident and which is capable of digitally processing information about the image of the subject, such as color and brightness. The image sensor 131 may be a charge-coupled device (CCD) sensor or a complementary metal-oxide-semiconductor (CMOS) sensor. The image sensor 131 is mounted exposed on the second frame 102c to correct for blurring along the second direction Y and/or the first direction X, thereby obtaining a clear image of the subject.

Figure 4:
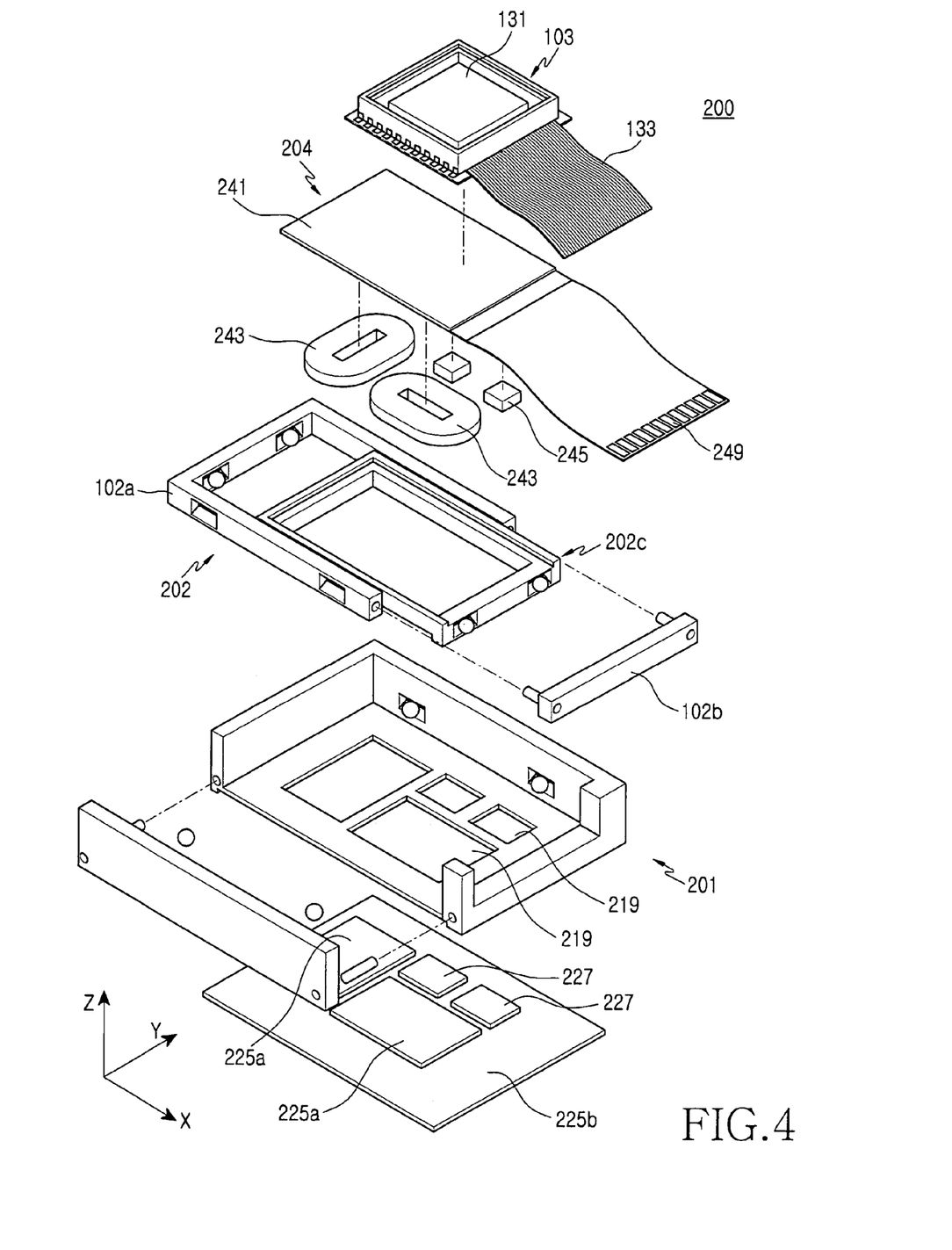
FIG. 4 is an exploded perspective view of a camera lens assembly according to a second embodiment of the present invention.
Figure 5:
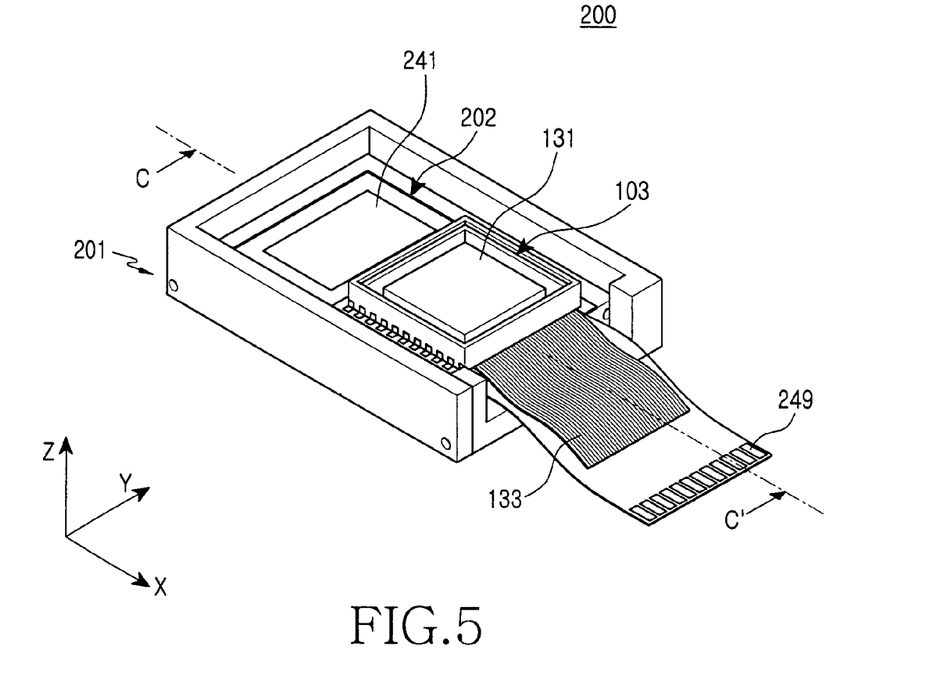
FIG. 5 is an assembled perspective view of an optical image stabilizer for the camera lens assembly shown in FIG. 4.
Figure 6:
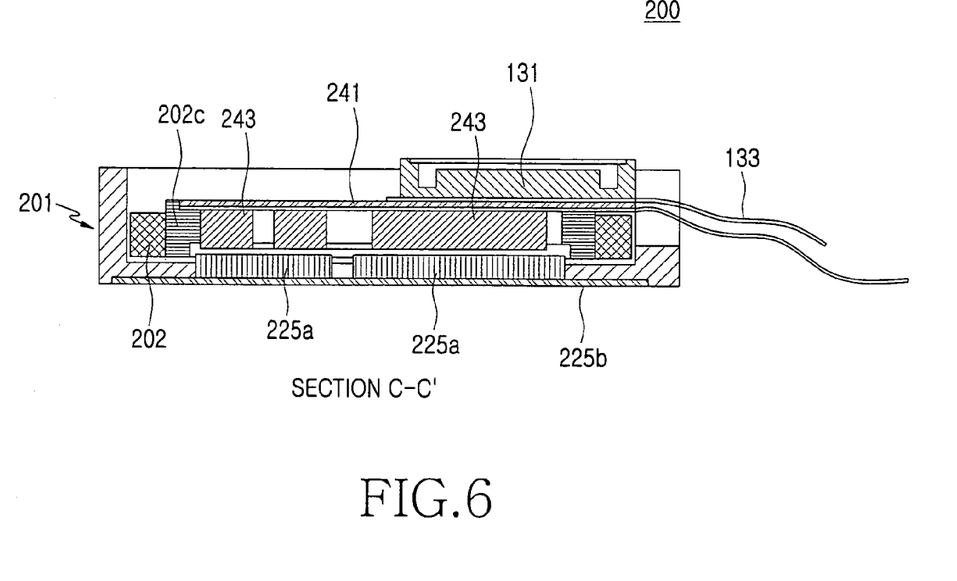
FIG. 6 is a cross-sectional view of an optical image stabilizer for a camera lens assembly, taken along a line C-C' of FIG. 5.

FIGS. 4 through 6 illustrate an optical image stabilizer 200 for a camera lens assembly according to a second embodiment of the present invention. FIG. 4 illustrates an exploded perspective view of optical image stabilizer 200. FIG. 5 illustrates an assembled view of optical image stabilizer 300 and FIG. 6 illustrates a cross-sectional view of optical image stabilizer 200 along Section C-C'. Referring to FIG. 3, the optical image stabilizer 200 is the same as the optical image stabilizer 100 according to the first embodiment of the present invention shown in FIG. 1, for example, except that coils 243 and position detecting sensors 245 are mounted on second frame 202c and driving permanent magnets 225a and sensor permanent magnets 227 are mounted on the main frame 201. Thus, in a detailed explanation of the current embodiment of the present invention, a configuration that is the same as or can be easily construed from the first embodiment of the present invention will use the same reference numerals as used in the first embodiment of the present invention or be omitted and a detailed description thereof need not be given.

In the optical image stabilizer 200 according to the second embodiment of the present invention, a coil portion 204, more specifically a printed circuit board (PCB) 241 of the coil portion 204 is mounted on the second frame 202c.

The coils 243 and the position detecting sensors 245 are mounted on the bottom surface of the PCB 241. Once the PCB 241 is assembled onto the second frame 202c, the coils 243 and the position detecting sensors 245 are surrounded by the second frame 202c. A circuit pattern (not shown) capable of transmitting a signal generated by the position detecting sensors 245 while applying a voltage to the coils 243 and the position detecting sensors 245 is mounted on the PCB 241. The PCB 241 is supplied with a voltage through the circuit pattern and a predetermined connector 249 or transmits a signal generated by the position detecting sensors 245. The camera device 103 mounted on the PCB 241 is positioned on the second frame 202c.

The bottom of the main frame 201 is closed by a predetermined support plate 225b and cutouts or holes 219 where the driving permanent magnets 225a and the sensor permanent magnets 227 can be positioned are formed on the bottom of the main frame 201. In some products, the support plate 225b may be integrated with the main frame 201. The driving permanent magnets 225a and the sensor permanent magnets 227 attached to the support plate 225b protrude toward the inside of the main frame 201 through the holes 219. The support plate 225b functions as a yoke to prevent a magnetic force of the driving permanent magnets 225a from flowing to the outside and cause the magnetic force to effectively act inside the optical image stabilizer 200. A yoke may also be attached onto the coils 243 to perform such a function. In another aspect, to reduce load during the movement of the first frames 102a and 102b and the second frame 202c, a yoke may be attached onto the main frame 201, instead of on the coils 243, to shield the top of the coils 243. In this case, if a yoke is attached onto the main frame 201 to shield the top of the coils 243, load caused by the driving permanent magnets 225a may be reduced during the movement of the first frames 102a and 102b and the second frame 202c.

Figure 7:
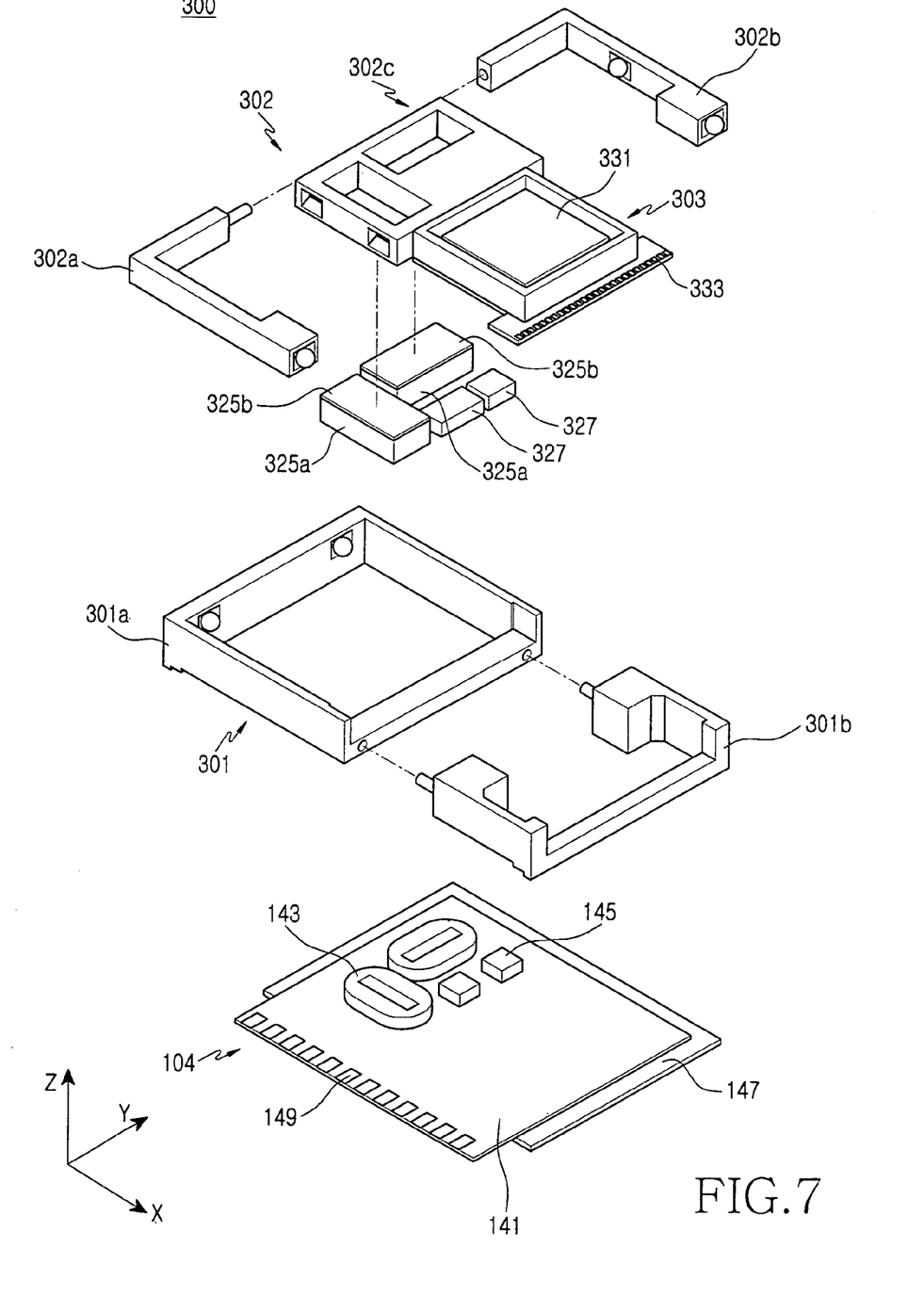
FIG. 7 is an exploded perspective view of a camera lens assembly according to a third embodiment of the present invention.
Figure 8:
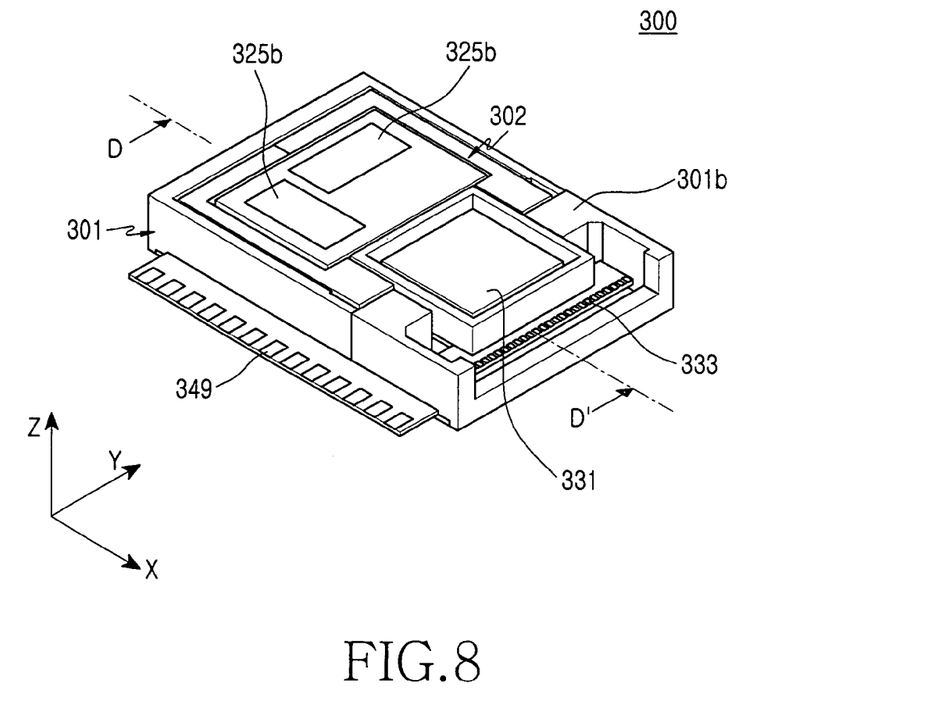
FIG. 8 is an assembled perspective view of an optical image stabilizer for the camera lens assembly shown in FIG. 7.
Figure 9:
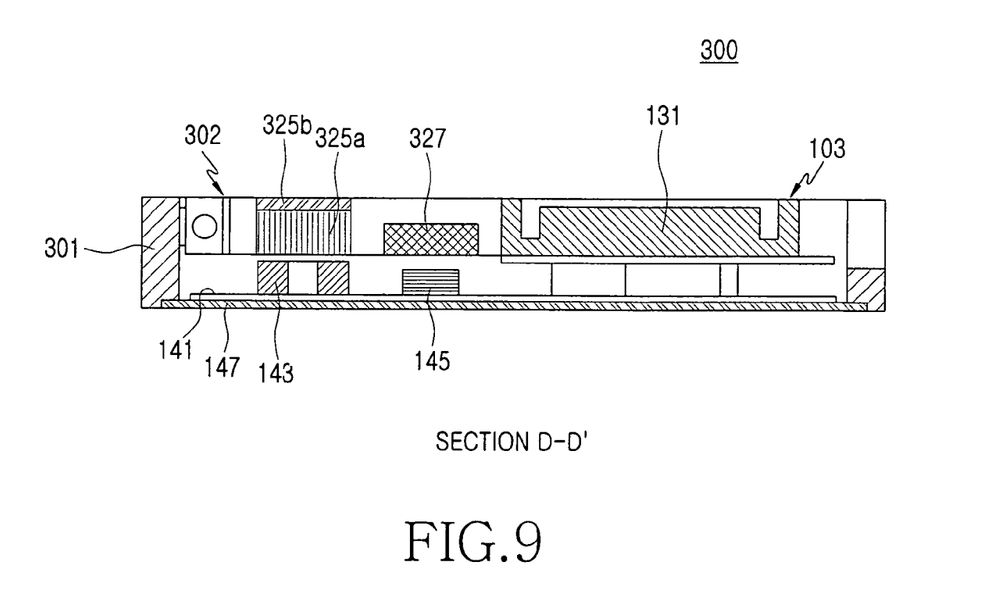
FIG. 9 is a cross-sectional view of an optical image stabilizer for a camera lens assembly, taken along a line D-D' of FIG. 8.

FIGS. 7 through 9 illustrate an optical image stabilizer 300 for a camera lens assembly according to a third embodiment of the present invention. FIG. 7 illustrates an exploded perspective view of optical image stabilizer 300. FIG. 8 illustrates an assembled view of optical image stabilizer 300 and FIG. 9 illustrates a cross-sectional view of optical image stabilizer 300 along Sections C-C'. Referring to FIG. 7, optical image stabilizer 300 is similar to the embodiments of the invention shown in FIGS. 1 and 4 but has a reduced thickness from the preceding embodiments of the present invention as camera device 303 is mounted at a side of and positioned in the same plane as second frame 302c.

The optical image stabilizer 300 includes a main frame 301, a driving frame 302, and the camera device 303 mounted at a side of the second frame 302c of the driving frame 302.

The main frame 301 includes a first frame member 301a whose side along the second direction, Y, is opened and a second frame member 301b combined with the opened side of the first frame member 301a. Sliding grooves for ball bearing combination are formed in an inner wall of the other closed side of the first frame member 301a along the second direction, Y. A portion of an end of the second frame member 301b combined with the opened side of the first frame member 301a protrudes toward the inside of the main frame 301. Although not shown in the figure, additional sliding grooves are formed at a portion protruding toward the inside of the main frame 301. The sliding grooves formed in an inner wall of the other closed side of the first frame member 301a and the sliding grooves formed in the second frame member 301b face each other. The sliding grooves formed in the main frame 301 extend in the second direction, Y, to guide movement of first frames 302a and 302b of the driving frame 302 along the second direction, Y.

The first frames 302a and 302b of the driving frame 302 are symmetric to each other. When assembled, the first frames 302a and 302b have an opened side along the second direction, Y. Sliding grooves are formed in the opened side of the first frames 302a and 302b and face the sliding grooves formed in the second frame member 301b. Ball bearings are interposed between the sliding grooves formed in the opened side of the first frames 302a and 302b and the sliding grooves formed in the second frame member 301b, thereby forming a slidable bearing. Sliding grooves are formed on an outer wall of the other closed side of the first frames 302a and 302b and face the sliding grooves formed in the first frame member 301a. Ball bearings are interposed between the sliding grooves formed in the closed side of the first frames 302a and 302b and the sliding grooves formed in the first frame member 301a, thereby forming a slidable bearing. Through the slidable bearing combination, the first frames 302a and 302b move with respect to the main frame 301 along the second direction Y.

Three outer walls of the second frame 302c of the driving frame 302 are surrounded by the first frames 302a and 302b and the camera device 303 is mounted at the remaining one outer wall of the second frame 302c. The camera device 303 includes a connector 333 which applies a voltage to an image sensor 331 and transmits an image signal captured by the image sensor 331. The opened sides of the first main frame member 301a and the first drive frames 302a and 302b communicate with the second main frame member 301b. The camera device 303 extends through the opened sides of the frames 302a and 302b and the first frame member 301a such that its portion is positioned on the frame member 301b.

Sliding grooves are formed in inner sidewalls of the first frames 302a and 302b along the first direction X and in outer sidewalls of the second frame 302c along the first direction X. Ball bearings are interposed between the sliding grooves formed in the first frames 302a and 302b and the sliding grooves formed in the second frame 302c, thereby forming a slidable bearing. Thus, the second frame 302c moves with respect to the first frames 302a and 302b along the first direction, X. In this way, the second frame 302c can move with respect to the main frame 301 along the first direction, X, and the second direction, Y.

The optical image stabilizer 300 includes the coil portion 104 and permanent magnets 325a and 327 that move the second frame 302c with respect to the main frame 301 to correct for blurring of a captured image due to user's handshaking.

The coil portion 104 includes the pair of coils 143, the pair of position detecting sensors 145, and the yoke 147 mounted on the top and bottom surfaces of the PCB 141 and the permanent magnets 325a and 327 include a pair of driving permanent magnets 325a having the top onto which a yoke 325b is attached and a pair of sensor permanent magnets 327. A driving force for moving the second frame 302c with respect to the main frame 301 along the first direction, X, or the second direction, Y, is generated by interaction between the coils 143 and the driving permanent magnets 325a. A change in the position of the sensor permanent magnets 327 is detected by the position detecting sensors 145 for use in the control of the position of the second frame 302c.

The optical image stabilizers 100, 200, and 300 according to the embodiments of the present invention can change the position of a camera device along two directions X and Y that are perpendicular to each other. A driving force for changing the position of a camera device is generated by interaction between magnetic forces of coils and permanent magnets generating electromagnetic forces upon the application of a current.

The movement range of a camera device to correct for blurring of a captured image due to handshaking can be set by those skilled in the art variously according to products and purposes thereof.

As described above, according to the present invention, the position of a camera device can be changed using a pair of coils and a pair of permanent magnets, contributing to miniaturization when compared to a conventional optical image stabilizer correcting for handshaking by moving a lens system. Thus, an optical image stabilizer according to the present invention can be easily mounted on a miniaturized photographing device such as a super compact digital camera or a mobile communication terminal to capture a clear image. In addition, a camera device is moved according to user's handshaking using coils and permanent magnets, contributing to simplification of a configuration, easiness in control, and reduction in manufacturing cost. Moreover, non-contact driving using coils and permanent magnets, instead of a piezoelectric device, is adopted to improve the reliability of a product. Furthermore, since a ball bearing is inserted between a main frame that is a fixed object and a driving frame that is a driving object, movement of the driving object is facilitated in an operation of correcting for handshaking and movement can be made in at least two directions, thereby improving correction rate.

While the invention has been shown and described with reference to preferred embodiments thereof, it will be understood by those skilled in the art that various changes in form and details may be made therein without departing from the spirit and scope of the invention.

For example, a connector is included in the third embodiment of the present invention to apply a voltage to an image sensor and transmit a signal, but an image sensor and a connector may be connected by a flexible printed circuit to prevent load from being caused by a connector having rigidity during movement of a second frame. In addition, although at least one pair of ball bearing combinations are included to facilitate movement of the second frame and maintain the horizontal state of the second frame in embodiments of the present invention, the number of ball bearing combinations can vary as long as the movement of the second frame can be facilitated and the horizontal state of the second frame can be maintained.

What is claimed is:

1. An optical image stabilizer for a camera lens assembly, the optical image stabilizer comprising:
    a main frame;
    a driving frame comprising a first frame and a second frame arranged within the first frame, each of said first frame and said second frame of said driving frame positioned for moving in at least one direction on the main frame with respect to the main frame;
    a camera device mounted on the driving frame;
    a pair of driving permanent magnets mounted on one of the main frame and the driving frame;
    a pair of coils mounted on the other of the main frame and the driving frame and facing the pair of driving permanent magnets; and
    at least one slidable bearing interposed between an inner sidewall of the main frame and an outer sidewall of the driving frame to facilitate movement of the driving frame, with respect to the main frame,
    wherein the driving frame moves by non-contact driving through interaction between an electromagnetic force generated by application of a current to the coils and a magnetic force of the driving permanent magnets so that the entire camera device moves along with the movement of the driving frame.

2. The optical image stabilizer of claim 1, further comprising a yoke mounted, together with the coils, on the other of the main frame and the driving frame, wherein movement of the driving frame along a direction that an image of a subject is incident to the camera device is restricted by attraction between the yoke and the driving permanent magnets.

3. The optical image stabilizer of claim 1, further comprising a yoke surrounding the coils and the driving permanent magnets, wherein the yoke forms an electric field shielding structure.

4. The optical image stabilizer of claim 1, wherein one of the coils, together with one of the driving permanent magnets facing the coil, is mounted along a first direction, and the other of the coils, together with the other of the driving permanent magnets facing the coil, is mounted along a second direction, and the second frame moves in the first direction or the second direction according to the coil to which a current is applied.

5. The optical image stabilizer of claim 1, further comprising:
- at least one sensor permanent magnets mounted on one of the main frame and the driving frame; and
- at least one position detecting sensor mounted on one of the main frame and the driving frame and facing the sensor permanent magnets,
- wherein the position detecting sensors detect movement of the driving frame according to a change in magnetic force generated from the sensor permanent magnets.

6. The optical image stabilizer of claim 1, wherein the driving frame includes a first frame mounted to move with respect to the main frame in a first direction on the main frame and the second frame mounted on the first frame in such a way to move, together with the first frame, in the first direction and to move with respect to the main frame in a second direction.

7. The optical image stabilizer of claim 6, wherein the second direction is perpendicular to the first direction on a plane where the second frame moves.

8. The optical image stabilizer of claim 6, further comprising:
- at least one first sliding groove formed in an inner sidewall of the main frame along one of the first direction and the second direction;
- a second sliding groove formed in an outer sidewall of the first frame along one of the first direction and the second direction and facing the first sliding groove; and
- a ball bearing whose portion is accommodated in the first sliding groove and whose other portion is accommodated in the second sliding groove to separate the inner sidewall of the main frame and the outer sidewall of the first frame,
- wherein the first sliding groove and the second sliding groove extend along one of the first direction and the second direction and the first frame moves in a direction that the first sliding groove and the second sliding groove extend.

9. The optical image stabilizer of claim 6, further comprising at least one slidable bearing interposed between the first frame and the second frame.

10. The optical image stabilizer of claim 9, wherein the slidable bearing comprises:
- at least one third sliding groove formed in an inner sidewall of the first frame along the other of the first direction and the second direction;
- a fourth sliding groove formed in an outer sidewall of the second frame along the other of the first direction and the second direction and facing the third sliding groove; and
- a ball bearing whose one portion is accommodated in the third sliding groove and whose other portion is accommodated in the fourth sliding groove to separate the inner sidewall of the first frame and the outer sidewall of the second frame,
- wherein the third sliding groove and the fourth sliding groove extend along the other of the first direction and the second direction and the first frame moves in a direction that the third sliding groove and the fourth sliding groove extend.

11. The optical image stabilizer of claim 6, further comprising:
- at least one sensor permanent magnet mounted on one of the main frame and the second frame; and
- at least one position detecting sensor mounted on one of the main frame and the second frame and facing the sensor permanent magnet,
- wherein the position detecting sensor detects movement of the second frame according to a change in magnetic force generated from the sensor permanent magnet.

12. The optical image stabilizer of claim 6, wherein the permanent magnets are mounted on one of the main frame and the second frame of the driving frame and the coils are mounted on the other of the main frame and the second frame.

13. The optical image stabilizer of claim 1, wherein the slidable bearing comprises:
- at least one first sliding groove formed in an inner sidewall of the main frame along one of the first direction and the second direction;
- a second sliding groove formed in an outer sidewall of the driving frame along one of the first direction and the second direction and facing the first sliding groove; and
- a ball bearing whose one portion is accommodated in the first sliding groove and whose other portion is accommodated in the second sliding groove to separate the inner sidewall of the main frame and the outer sidewall of the driving frame,
- wherein the driving frame moves in a direction that the first sliding groove and the second sliding groove extend.

14. A method for compensating for movement of a camera lens comprising the steps of:
- arranging a camera device on a driving frame that is movable in at least one direction with respect to a main frame; and
- providing at least one slidable bearing existing between an inner sidewall of the main frame and an outer sidewall of the driving frame, wherein the driving frame comprises a first frame and a second frame arranged within the first frame, each of said first frame and said second frame of said driving frame positioned for movement with respect to the main frame by non-contact driving through interaction between an electromagnetic force generated by a magnetic force of an opposing permanent magnet and by application of a current to at least one coil, and wherein a first pair of coil and opposing permanent magnetic provide movement in a first direction and a second pair of coil and opposing permanent magnetic provide movement in a second direction.

15. The method as recited in claim 14, wherein the camera device is mounted on the driving frame.

16. The method as recited in claim 14, wherein the camera device is mounted in the same plane as the driving frame.

* * * * *